(12) United States Patent
Heitzer

(10) Patent No.: US 6,394,218 B1
(45) Date of Patent: May 28, 2002

(54) STEERING SYSTEM FOR A VEHICLE

(75) Inventor: Heinz-Dieter Heitzer, Heinsberg (DE)

(73) Assignee: TRW Fahrwerksysteme GmbH & Co. KG, Dusseldorf (DE)

( * ) Notice: Subject to any disclaimer, the term of this patent is extended or adjusted under 35 U.S.C. 154(b) by 0 days.

(21) Appl. No.: 09/641,582

(22) Filed: Aug. 18, 2000

(30) Foreign Application Priority Data

Sep. 3, 1999 (DE) ..................................... 299 15 559 U

(51) Int. Cl.$^7$ ................................................. B62D 5/06
(52) U.S. Cl. ...................................... 180/402; 180/444
(58) Field of Search .......................... 180/402, 443, 180/444, 446

(56) References Cited

U.S. PATENT DOCUMENTS

| | | | | |
|---|---|---|---|---|
| 5,097,917 A | * | 3/1992 | Serizawa et al. | 180/402 |
| 5,159,553 A | * | 10/1992 | Karnopp et al. | 180/402 |
| 5,506,776 A | * | 4/1996 | Fushimi et al. | 180/413 |
| 5,747,950 A | * | 5/1998 | Friedrichsen et al. | 318/5 |
| 5,828,972 A | * | 10/1998 | Asanuma et al. | 180/446 |
| 6,053,273 A | * | 4/2000 | Shimizu et al. | 180/444 |
| 6,059,068 A | * | 5/2000 | Kato et al. | 180/402 |
| 6,079,513 A | * | 6/2000 | Nishizaki et al. | 180/402 |
| 6,176,341 B1 | * | 1/2001 | Ansari | 180/402 |
| 6,208,923 B1 | * | 3/2001 | Hommel | 180/402 |

FOREIGN PATENT DOCUMENTS

| | | | |
|---|---|---|---|
| DE | 4232256 | 4/1993 | |
| DE | 4241849 | 4/1996 | |
| DE | 19714297 | 11/1997 | |
| DE | 19508501 | 3/1998 | |
| DE | 19804675 | 8/1998 | |
| DE | 19750585 | 6/1999 | |
| DE | 19833460 | 1/2000 | |
| DE | 19834870 | 2/2000 | |
| DE | 19912169 | 7/2000 | |
| EP | 0857638 | * 12/1998 | ............ B62D/5/04 |
| WO | 9929557 | 6/1999 | |

* cited by examiner

Primary Examiner—Daniel G. DePumpo
(74) Attorney, Agent, or Firm—Tarolli, Sundheim, Covell, Tummino & Szabo L.L.P.

(57) ABSTRACT

A steering system comprises a steering linkage and two positioners capable of positioning the steering linkage in unison. Each positioner comprises an electronic control circuit, a servomotor and a position sensor for sensing a position of the servomotor.

9 Claims, 1 Drawing Sheet

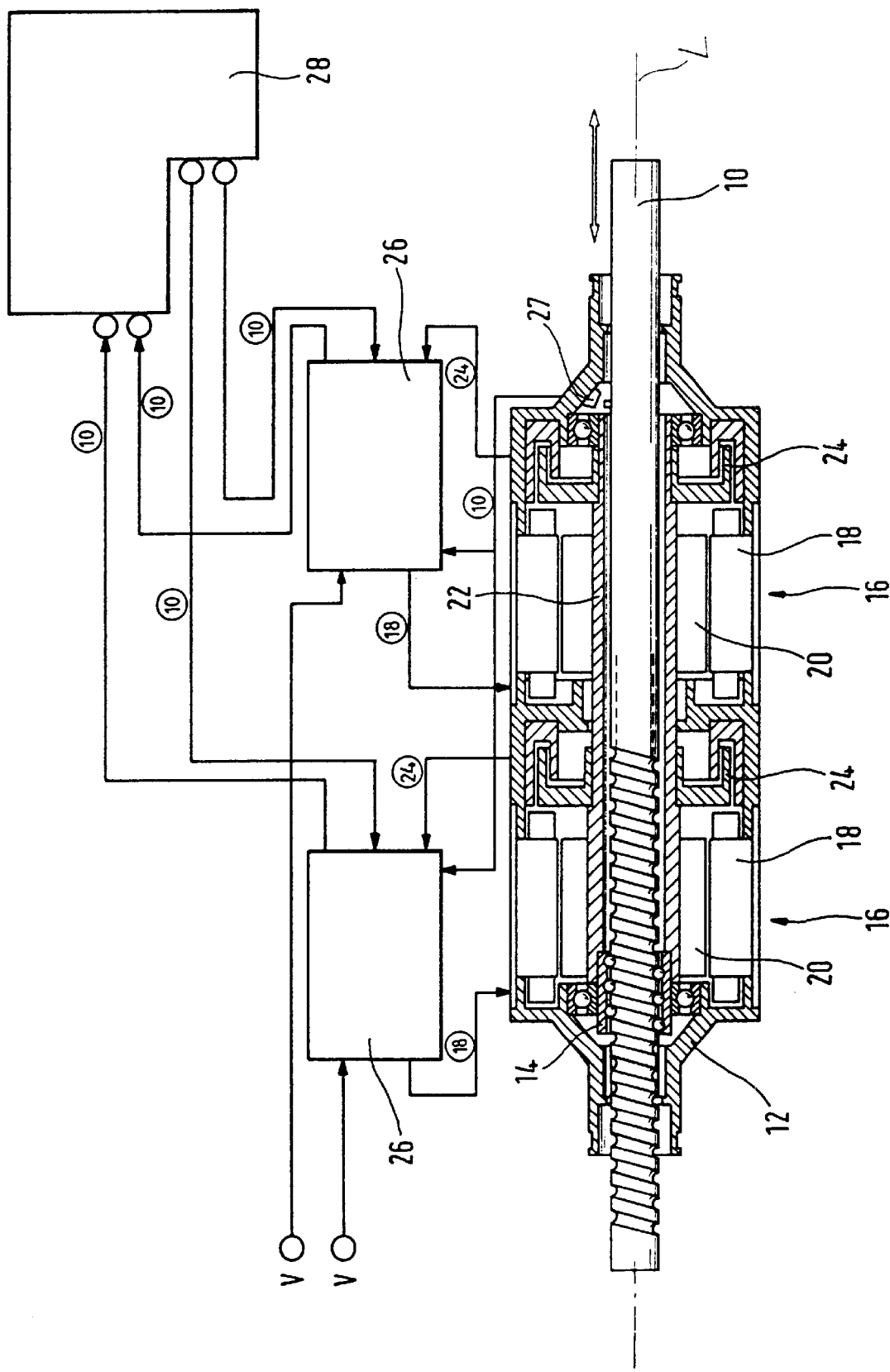

STEERING SYSTEM FOR A VEHICLE

TECHNICAL FIELD

The invention relates to a steering system for a vehicle in which no mechanical connection exists between the steering wheel and the steering linkage of the vehicle.

BACKGROUND OF THE INVENTION

Such steering systems are known as "steer-by-wire" systems. In such systems the steering movement of the steering wheel is transmitted electronically from the steering wheel to the steering linkage by the steering angle input by the driver being transmitted "by wire" firstly to the electronic control circuit which then sends "by wire" a positioning command to an actuator configurable as an hydraulic or electrical servomotor which produces the steering movement at the front axle steering linkage. In this arrangement the electronic control circuit processes signals received from various sensors. The two most important signals are the setpoint value for the steering angle as input by the driver at the steering wheel, and the actual value of the position of the steering linkage at the front wheels resulting from the positioning movement of the actuator. Further signals may be, for example, the speed and yaw rate of the vehicle.

In addition to the function of dictating the steering movement of the front wheels such a steering system has the task of furnishing the driver with a perceptible signal, i.e. giving him a "feel" for the road contact of the front wheels. Thus, a steer-by-wire system not only needs to be able to translate the steering movements of the driver into positioning movements at the wheels but also to produce the restoring forces at the steering wheel relating to the cornering forces transmitted between the road surface and the front wheels. For this purpose a further actuator is needed which is connected to the steering wheel, this actuator too, being signaled electronically. However, it is not the function of this actuator to implement a positioning movement, it instead serving to produce a perceptible holding moment at the steering wheel for the driver. For this purpose the electronic control circuit needs to process information as to the cornering forces at the wheels of the front axle. This information is made available either by force sensors arranged in the steering linkage or it is derived from the hydraulic pressure acting on the actuator or the applied current strength to indirectly receive a measure for the cornering forces at the wheels of the front axle.

The advantage of such a steering system as compared to a conventional, mechanical steering system is, more particularly, that the steering translation is freely selectable, for example, as a function of the vehicle speed. The boost in the steering force is likewise freely programmable. As an additional function an active, dynamic correction of the steering angle may be provided serving to enhance the stability of the riding performance. This function is comparable to that of so-called ESP systems which provide automatic braking in enhancing the stability of the riding performance. Finally, the steering may also be made use of for automatic tracking and in preventing collision.

One important consideration as regards steer-by-wire systems is their fail-safe response, i.e. single defects in the system, which cannot be excluded with a probability bordering on certainty, must never result in total failure of the system and thus to loss of vehicle steerability. To satisfy this requirement all active safety-relevant chassis systems make use of a fallback, based on conventional engineering, which enables a defective active system to be rendered safe by taking it out of circuit. As an alternative multiple redundancy solutions could be provided, in which faults in the redundant sub-systems are automatically compensatable, such systems being termed error tolerant.

BRIEF SUMMARY OF THE INVENTION

The invention provides a steering system with which the functions as cited above are achievable by particularly simple means whilst simultaneously assuring satisfaction of all safety requirements. This is achieved in a steering system which comprises a steering linkage and two positioners capable of positioning the steering linkage in unison. Each positioner comprises an electronic control circuit, a servomotor and a position sensor for sensing a position of the servomotor. This system is thus configured partly redundant; the steering linkage, since it is configured conventional and structured purely mechanical, is generally viewed as being fail-safe, so that in this case no redundancy is needed, whereas the components needed for actuating the steering linkage and which could be at fault, e.g. due to a power failure, are designed redundant to ensure the desired operational safety in this case without a mechanical connection existing between the vehicle steering wheel and the steering linkage.

In accordance with one preferred embodiment of the invention the steering linkage includes a translatory displaceable steering spindle, a recirculating ball nut being provided which is driven by the servomotors. This is a solution having a mechanical design with a proven record of success and which is highly compact and thus takes up little space.

Preferably the two servomotors comprise one rotor each, the axis of rotation of which coincides with the longitudinal axis of the steering spindle, i.e. the rotors are arranged concentrically around the steering spindle; this too, resulting in a compact configuration.

Preferably the two rotors of the servomotors are arranged on a common drive spindle; this too, resulting in a particularly compact configuration.

Preferably the two rotors are encapsulated separate from each other, this ensuring that should one of the servomotors develop a fault, for example burn-out of the rotor winding, the other servomotor is not involved, it thus continuing to remain functional.

It may further be provided for that the two electronic control circuits are encapsulated separate from each other; this too, serving to enhance the fail-safe response.

In accordance with the preferred embodiment of the invention a control unit is provided as well as a steering torque sensor whose signal is processed by the control unit, the control unit switching off the steering system as soon as the difference between the setpoint torque of the servomotors as defined on the basis of the signal for the steering torque and the actual torque exceeds a predetermined value. In this way it is assured that the value for the setpoint torque is either correct or equals zero, thus faulty steering action being prevented.

It may be provided for that each of the two servomotors is dimensioned such that the torque generated by it as a maximum is not sufficient to move the steering linkage in the standstill of the vehicle. This takes into account the knowledge that the force needed in the steering linkage to tilt the wheels of the vehicle when on the move amounts to only roughly 30% of the force required to tilt the wheels of the vehicle when in standstill. Should one of the two servomotors develop a fault whilst the vehicle is in standstill, it is not necessary that the remaining servomotor executes a steering movement since the system as a whole can be safely switched off when the vehicle is in standstill. When, however, one of the two servomotors develops a fault whilst the vehicle is on the move, comparatively small forces are sufficient to maintain the vehicle steerable until it is safely brought to a halt, after which the system can be switched off.

For sensing the position of the steering linkage a switch may be provided which senses a specific position of the steering linkage. In this way the control unit is able to be informed at a specific point in time as to the absolute position of the steering linkage. Subsequently, the actual position in each case is determined by calculating—via the position sensor of the servomotor and the pulses furnished thereby—which path length the linkage has traveled since the specific position was last determined. As an alternative, a position sensor may be provided which transmits the absolute position of the steering linkage at every point in time.

To provide the control unit with information as to the cornering force actually effective at the wheels, a force sensor may be arranged on the steering linkage. As an alternative, a sensor for the current supplied to the servomotors may be provided so that the forces acting on the steering linkage can be deduced from the current and the resulting torque. It is also conceivable to compute the effective cornering forces as a function of the vehicle speed, the steering angle and/or the yaw rate of the vehicle when corresponding sensors are provided.

Advantageous aspects of the invention read from the sub-claims.

BRIEF DESCRIPTION OF THE DRAWING

The sole drawing illustrates schematically a steering system according to the invention.

DETAILED DESCRIPTION OF THE PREFERRED EMBODIMENT

Referring now to this drawing the steering system contains a steering spindle 10 having a longitudinal axis L and being capable of performing a translatory movement in a casing 12. Connected to the steering spindle 10 is a steering linkage (not shown) leading to the steerable wheels of a vehicle.

The translatory movement of the steering spindle 10 in the casing 12 is achieved by means of a recirculating ball nut 14 which may be driven by two positioners 16 disposed in sequence in the interior of the casing 12. Each positioner 16 comprises a servomotor 18 including a rotor 20. The rotors 20 of the servomotors 18 are arranged on a common drive spindle 22 which is non-rotatably connected to the recirculating ball nut 14. The drive spindle 22 together with the rotors 20 is arranged concentrically to the steering spindle 10.

Each positioner 16 also comprises a position sensor 24 capable of sensing the rotational position of the corresponding rotor 20. The servomotor 18 and the sensor 24 of each positioner are encapsulated so that a defect in any one servomotor cannot detriment the functioning of the other. Each positioner 18 comprises in addition an electronic control circuit 26 serving to signal the corresponding servomotor 18. For this purpose each electronic control circuit 26 is furnished with a supply voltage V so that each servomotor can be supplied with the necessary current.

Also housed in the casing 12 is a position sensor 27 capable of sensing a specific position of the steering spindle 10, for example, its center position. The electronic control circuit 26 is able to determine the actual position of the steering spindle in each case on the basis of the signal furnished by the position sensor 27 in conjunction with the signal furnished by the corresponding position sensor 24.

Signaling the corresponding servomotor occurs in accordance with the information made available to the electronic control circuit 26. For example, each electronic control circuit receives a signal from the position sensor 24 indicating the rotational position of the rotor of the servomotor. The electronic control circuit 26 receives further a signal from a control unit 28 indicating the setpoint position of the steering spindle 10. This setpoint value is established by the control unit as a function of external parameters, for example, depending on the setpoint value of a steering angle made available by a steering angle sensor. This is, however, known as such, so that it will not be detailed in the present.

The control unit 28 receives in turn signals representing the force acting in the steering spindle 10 and thus permits conclusions as to the cornering force acting on the steerable vehicle wheels. In the embodiment as shown, this information is received on the basis of the current supplied to the servomotors 18; this current and the torque subsequently furnished by the servomotor relates to the force acting on the steering spindle 10 in a specific ratio.

Unlike error tolerant systems in which usually a mechanical connection is provided between the steering wheel and the steering spindle, forming a fallback should any component of the steering system develop a fault, the present steering system is configured redundant. Should one of the servomotors become defective the other servomotor is still able to ensure continuing steerability of the vehicle as long as it is on the move. Should one of the position sensors 24 become defective the remaining sensor is still able to furnish the required information.

What is claimed is:

1. A steering system for a vehicle, said steering system comprising:

a housing;

a steering linkage and two positioners located in said housing, each of said two positioners positioning the steering linkage, each positioner comprising an electronic control circuit, a servomotor, and a position sensor for sensing a position of said servomotor, said steering linkage comprising a translatory displaceable steering spindle, and a recirculating ball nut which is driven by each of said two servomotors, each of said two servomotors comprising a rotor, each of said rotors having an axis of rotation coinciding with a longitudinal axis of said steering spindle, each of said rotors being encapsulated separate from each other in a chamber defined by wall portions of said housing.

2. The steering system as set forth in claim 1, wherein said two rotors of said servomotors are arranged on a common drive spindle.

3. The steering system as set forth in claim 1, wherein said two electronic control circuits are encapsulated separate from each other.

4. The steering system as set forth in claim 1, wherein each of said two servomotors is dimensioned such that a torque generated by said two servomotors at a maximum is not sufficient to move said steering linkage when said vehicle is in a standstill position.

5. The steering system as set forth in claim 1, wherein a switch is provided for sensing a specific position of said steering linkage.

6. The steering system as set forth in claim 1, wherein a position sensor is provided for sensing a position of said steering linkage.

7. The steering system as set forth in claim 1, wherein a force sensor is arranged at said steering linkage.

8. The steering system as set forth in claim 1, wherein a sensor is provided for sensing a current furnished to said servomotors.

9. The steering system as set forth in claim 1, wherein a sensor is provided for sensing at least one of a vehicle speed, a steering angle and a yaw rate of said vehicle.

\* \* \* \* \*